United States Patent [19]
Song

[11] Patent Number: 5,483,464
[45] Date of Patent: Jan. 9, 1996

[54] POWER SAVING APPARATUS FOR USE IN PERIPHERAL EQUIPMENT OF A COMPUTER

[75] Inventor: Moon-Jong Song, Suwon, Rep. of Korea

[73] Assignee: SamSung Electronics Co., Ltd., Kyungki-do, Rep. of Korea

[21] Appl. No.: 176,450

[22] Filed: Dec. 30, 1993

[30]     Foreign Application Priority Data

Mar. 31, 1993 [KR] Rep. of Korea ............... 5332/1993

[51] Int. Cl.$^6$ .................................................. G06F 1/32
[52] U.S. Cl. ............... 364/492; 307/38; 307/39; 307/64; 364/707; 395/750
[58] Field of Search ................... 307/38, 39, 64, 307/125; 364/492, 493, 707; 395/750

[56]            References Cited

U.S. PATENT DOCUMENTS

| | | | |
|---|---|---|---|
| 4,365,290 | 12/1982 | Nelms et al. | 364/707 X |
| 4,591,914 | 5/1986 | Hakamada et al. | 307/64 X |
| 4,593,349 | 6/1986 | Chase et al. | 364/492 X |
| 4,667,289 | 5/1987 | Yoshida et al. | 364/707 X |
| 4,674,031 | 6/1987 | Siska, Jr. | 364/492 X |
| 4,677,566 | 6/1987 | Whittaker et al. | 364/492 |
| 4,747,041 | 5/1988 | Engel et al. | 364/707 X |
| 5,059,961 | 10/1991 | Cheng | 345/10 |
| 5,163,124 | 11/1992 | Yabe et al. | 395/750 |
| 5,175,845 | 12/1992 | Little | 364/707 X |
| 5,214,785 | 5/1993 | Fairweather | 395/800 |
| 5,237,692 | 8/1993 | Raasch et al. | 395/725 |
| 5,249,298 | 9/1993 | Bolan et al. | 395/750 |
| 5,251,320 | 10/1993 | Kuzawinski et al. | 395/750 |
| 5,293,494 | 3/1994 | Saito et al. | 395/275 |
| 5,347,167 | 9/1994 | Singh | 364/493 X |
| 5,375,245 | 12/1994 | Solhjell et al. | 395/750 |
| 5,384,721 | 1/1995 | Joto | 364/707 |
| 5,408,668 | 4/1995 | Tornai | 395/750 |

*Primary Examiner*—Edward R. Cosimano
*Attorney, Agent, or Firm*—Robert E. Bushnell

[57]            ABSTRACT

An apparatus for use in the peripheral equipment of a computer reduces the needless consumption of power. Once it has been determined that the computer has not been used for a predetermined period of time, an operation control signal indicative of a specific control mode is supplied for controlling the supply of power to the computer's peripheral equipment and the computer's operating state. The operation of a power supply means for generating operating power to a computer's peripheral equipment is controlled in response to a detected control mode. Accordingly, energy is conserved by controlling the supply of power and the operating state of a computer's peripheral equipment according to the peripheral equipment's operational state.

27 Claims, 9 Drawing Sheets

POWER SAVING APPARATUS FOR USE IN PERIPHERAL EQUIPMENT OF A COMPUTER

BACKGROUND OF THE INVENTION

The present invention relates to a power saving apparatus for use in peripheral equipment of a computer, and more particularly to a power saving apparatus that selectively controls the supply of power to or the operational state of computer peripheral equipment in order to conserve power.

Generally, peripheral equipment of a computer represents input/output units connected to a computer system. Common examples of such equipment include monitors, printers, CD-ROM's (Compact Disk-Read Only Memory), and plotters. Usually, peripheral equipment cannot be used immediately after the computer system's power supply is turned on since the equipment requires an initial warm-up period before operation can be commenced. Even if the computer system's power is turned off momentarily and is immediately turned back on, the peripheral equipment still requires the full amount of warm up time until it can be operated. Accordingly, whenever the computer system's power is turned on, waiting for the peripheral equipment to warm up can be very inconvenient. To avoid this problem, a user is required to constantly keep the computer system's power on, so that the peripheral equipment is continually supplied with power. However, this precaution has its drawbacks since it produces alot of needless power consumption. This is particularly true with the computer's monitor. Since the monitor typically drives a CRT (Cathode-Ray Tube) i.e. display means, using a high voltage, there is a great deal of needless power consumption which is very wasteful and expensive for the user.

One attempt to solve these problems is disclosed in U.S. Pat. No. 5,059,961 entitled *Screen Blanker for a Monitor of a Computer System* issued to Cheng. In this effort, image data from the monitor is blanked if them are no key inputs by the user for a predetermined period of time. If the monitor is blanked and the user then inputs a key function, the screen blanking function is inactivated and the user is once again free to use the monitor and have access to the previously displayed images. However, since the monitor is still supplied with most of its normal power requirements during the period of screen blanking, I believe that power savings is minimal. Also, this invention applies only to the monitor. Therefore, other pieces of peripheral equipment used in the system still suffer from the above mentioned disadvantages.

Another attempt at a power saving apparatus is shown in U.S. Pat. No. 5,249,298 entitled *Battery-Initiated Touch-Sensitive Power-Up* issued to Bolan et al. In this invention, a power-switching device is used to connect and disconnect a computer system's power supply unit from power line connection. This is accomplished by a battery powered circuit which monitors a contact pad, and powers up the computer system when a user touches the contact. However, when the system is powered down, all parts of the system (not just peripheral equipment and monitor) are disconnected from the power supply. Therefore, whenever the computer system's power is turned on, waiting for the unit (and its peripheral equipment) to warm up can be very inconvenient.

In U.S. Pat. No. 5,237,692 entitled *Internal Interrupt Controller for a Peripheral Controller* issued to Raasch et al., an interrupt controller provides an interrupt register for a peripheral controller and generates an interrupt any time one or more of the devices controlled by the peripheral controller is activated. The peripheral controller enters a low power consumption mode if no interrupts arc detected for a predetermined period of time. When the interrupt controller generates an interrupt, the peripheral controller is activated from a low power mode and services the device(s) which have caused the interrupt. Raasch however, contains no discussion of using such a power saving feature in the computer's monitor. Since the monitor typically requires a high voltage, it is my opinion that the power savings is minimal.

SUMMARY OF THE INVENTION

Accordingly, it is an object of the present invention to provide a power saving apparatus for use in a computer's peripheral equipment that ceases the power supplied to the equipment if the computer has not been used for a predetermined period of time.

It is another object of the present invention to provide a power saving apparatus for use in computer peripheral equipment that controls power so that the equipment maintains operability as if the computer were in use.

It is still another object of the present invention to provide a power saving apparatus for use in a computer monitor that controls power so that the monitor maintains operability as if the computer were in use.

It is a further object of the present invention to provide a power saving apparatus for use in a computer monitor that selectively controls power so that the monitor maintains operability as if the computer were in use.

To achieve these objects, the present invention includes a computer for generating an operation control signal indicative of an OFF mode when the computer system has not been used for a predetermined period of time. A power supply unit is provided for generating power for the computer's various pieces of peripheral equipment. A control input detector is provided for detecting a control mode indicated by the operation control signal. A power controller is provided for stopping the power supplied to, and operation of, the power supply unit when the control mode detected by the control input detector indicates an OFF mode, thus stopping the supply of power to the computer's peripheral equipment.

Also, a main power controller is provided for stopping operation of the power supply unit when the control mode indicates the OFF mode, and restarts operation of the power supply unit when the control mode indicates an ON mode. An auxiliary power supply unit generates operating power for the control input detector. An auxiliary power controller detects the operational state of the power supply unit and stops operation of the auxiliary power supply unit if the power supply unit is in an ON state, and restarts operation of the auxiliary power supply unit if the power supply unit is in an OFF state.

The power saving apparatus for use in a computer monitor includes an external controller for selectively generating a horizontal synchronizing signal and a vertical synchronizing signal to indicate a designated control mode. The control mode is one of an ON mode, a Standby mode, a Suspensory mode, and an OFF mode, and corresponds to the computer's state of use. A control mode detector is provided for detecting the designated control mode in dependence upon the horizontal synchronizing signal and the vertical synchronizing signal. A video controller mutes a video signal processed by video processing means of the monitor when the control mode detector identifies the Standby mode as the applicable control mode. Also, a main power supply unit is provided for generating operating power for a display portion, display drive portions, and the control mode detector. A main power controller is provided for stopping operation of the main power supply when the control mode detected by the control mode detector indicates the OFF mode, and restarting operation of the main power supply when the detected control mode indicates the ON mode.

The power saving apparatus also includes an auxiliary power supply unit for generating operating power for the control mode detector and the main power controller, and a power supply switch unit connected between the main power supply unit and display drive portions cuts off operating power to the display drive portions when the control mode detector determines that the applicable control mode is the Suspensory mode.

Also, the control mode detector includes a first control input detector for detecting the presence or absence of the horizontal synchronizing signal by converting the horizontal synchronizing signal into a first signal having a voltage level corresponding to the frequency of the horizontal synchronizing signal, a second control input detector for detecting the presence or absence of the vertical synchronizing signal by converting the vertical synchronizing signal into a second signal having a voltage level corresponding to a frequency of the vertical synchronizing signal, and a mode decoder for decoding the first and second signals of the first and second input detector to detect the control mode.

BRIEF DESCRIPTION OF THE DRAWINGS

A more complete appreciation for this invention, and many of the attendant advantages thereof, will be readily apparent and become better understood by reference to the following detailed description when considered in conjunction with the accompanying drawings in which like reference symbols indicate the same or similar components, wherein.

DETAILED DESCRIPTION OF THE INVENTION

Figure 1:
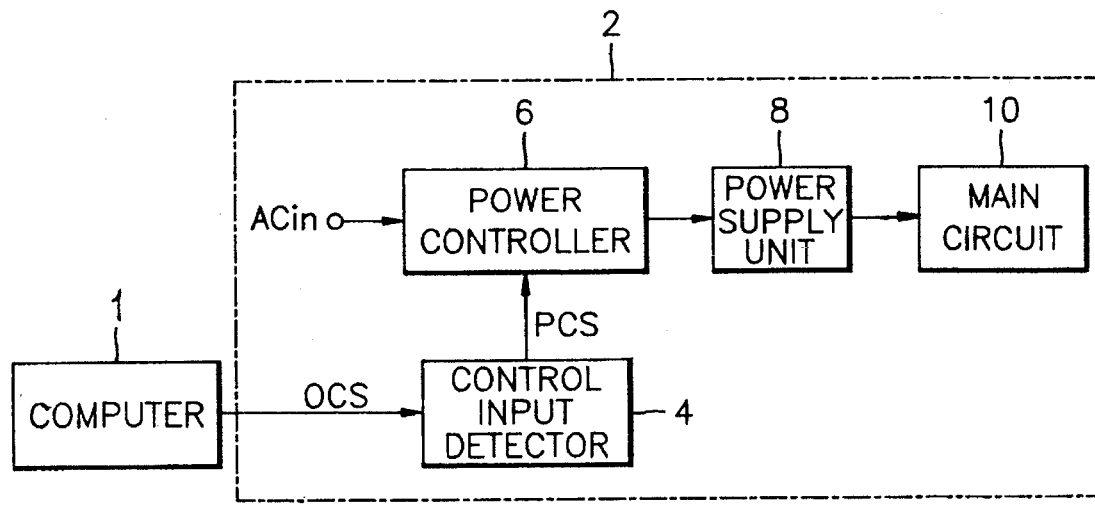
FIG. 1 is a block diagram showing an embodiment of a power saving apparatus according to the principles of the present invention.

Turning now to the drawings, FIG. 1 shows a block diagram of an embodiment of a power saving apparatus for use in a computer's peripheral equipment constructed according to the principles of the present invention. In this embodiment, a computer 1 generates an operation control signal OCS for controlling the supply of power to a computer's peripheral equipment 2 corresponding to the computer's operational state. The operation control signal OCS indicates either an ON-mode or an OFF-mode. The ON-mode is a control mode indicating a normal supply of power to the peripheral equipment 2 and the OFF-mode is a control mode indicating a stoppage of power to the peripheral equipment 2. The computer 1 generates an operation control signal OCS indicative of an ON-mode while a user continuously uses the computer system, and generates an operation control signal OCS indicative of an OFF-mode if the user has not used the computer system for a predetermined period of time. A control input detector 4 receives the operation control signal OCS supplied from the computer 1 indicating the applicable control mode (i.e. the OFF-mode or the ON-mode). The control input detector then generates a power control signal PCS in dependence upon the state of the operation control signal OCS. The power control signal PCS is then supplied to the power controller 6 which supplies or cuts off input power ACin to a power supply unit 8 in dependence upon the power control signal. It can be assumed that the input power ACin is commercially available AC power. The power supply unit 8 supplies the input power ACin received through the power controller 6 to a main circuit 10. The main circuit 10 operates from the power supplied by the power supply unit 8 and enables peripheral equipment 2 to perform various functions.

Referring again to FIG. 1, and briefly to Cheng, U.S. Pat. No. 5,059,961, the generation of operational control signal OCS in computer 1 may be described as follows. A screen blanker (see FIG. 1 of Cheng '961) supplies or interrupts vertical synchronizing signal and horizontal synchronizing signal generated by a CRT controller in correspondence with the in-use state of the computer system. This is shown in detail in FIG. 2 of Cheng '961, which shows a detailed circuit diagram of the screen blanker. When the user continuously uses the computer system, a high level signal "1" is applied to a video controller from an output terminal of a detector so that a vertical synchronizing signal and a horizontal synchronizing signal are entered into a video monitor through the video signal controller. When the user has not used the computer system for a predetermined period of time, a low logic level signal "0" is applied to the video signal controller from the output terminal of the detector so that the vertical synchronizing signal and horizontal synchronizing signal generated by the CRT controller is not provided to the video monitor.

Accordingly, an output signal from the output terminal of the detector or the output states of the vertical synchronizing signal and horizontal synchronizing signal provided by the video signal controller is applied to peripheral equipment 2 as an operational control signal OCS. Consequently, operational control signal OCS can be different logic states or the presence or absence state of the vertical synchronizing signal or horizontal synchronizing signal, according to the power control mode. It may be noted that operational control signal OCS can be generated in ways different from that noted in Cheng '961.

Figure 2:
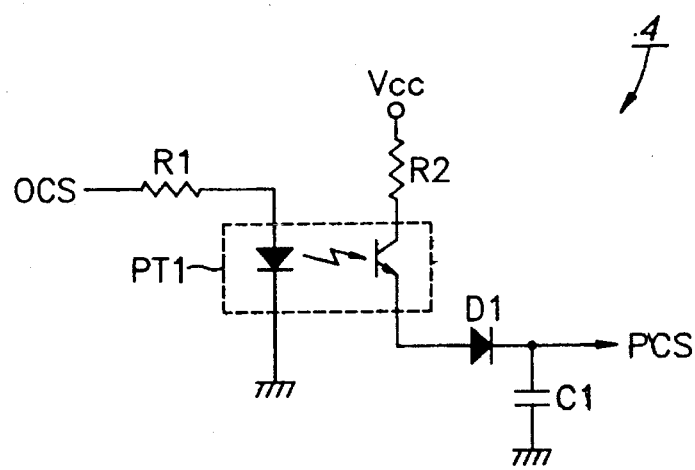
FIG. 2 is a detailed circuit diagram showing an embodiment of a control input detector as shown in FIG. 1.

FIG. 2 shows a detailed circuit diagram of the control input detector for detecting the logic state of the operation control signal OCS. Here, assume that a logic state of zero is generated when the operation control signal OCS indicates an ON-mode and a logic state of one is generated when the operation control signal OCS indicates an OFF-mode. The operation control signal OCS from the computer 1 is supplied to an anode of a light emitting diode of a photo-coupler PT1 through a resistor R1. A cathode of the light emitting diode of the photo-coupler PT1 is connected to a ground potential. A resistor R2, a light receiving transistor of the photo-coupler PT1, and an anode of a diode D1 are serially connected to a voltage source Vcc. A cathode of the diode D1 is connected to an input terminal of the power controller 6 and is connected to a ground potential through a capacitor C1. The voltage source Vcc is supplied from the power supply unit 8 of FIG. 1. A signal outputted through the diode D1 is supplied to the power control unit 6 as a power control signal PCS. When the operation control signal OCS is in a logic state of zero, the photo-coupler PT1 is in an OFF state, and the power control signal PCS is supplied as a logic state of zero to the power controller 6. If the operation control signal OCS is in a logic state of one, the photo-coupler PT1 is in an ON state, and the power control signal PCS is supplied as a logic state of one to the power controller 6.

Figure 3:
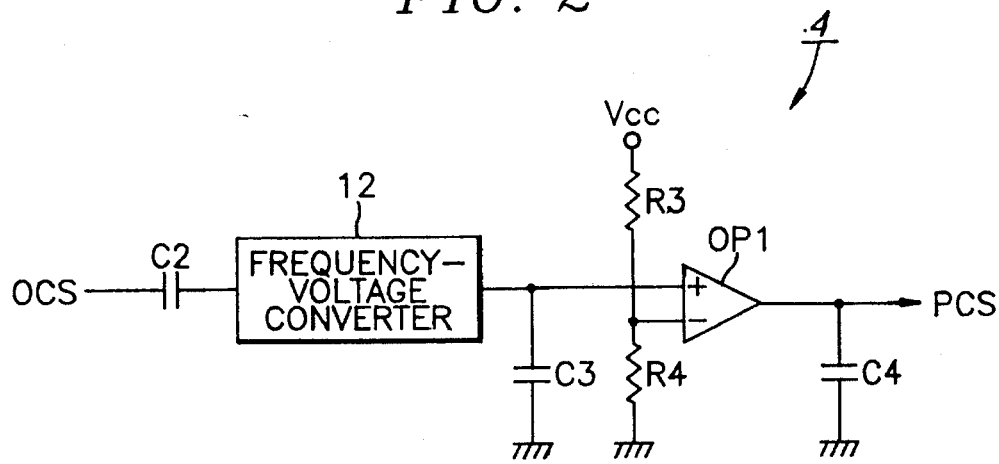
FIG. 3 is a detailed circuit diagram showing another embodiment of a control input detector as shown in FIG. 1.

FIG. 3 shows a detailed circuit diagram of the control input detector for detecting signals when the operation control signal OCS has a predetermined frequency, i.e., a horizontal synchronizing signal or a vertical synchronizing signal generated from the video card of the computer 1. Here, assume that the horizontal synchronizing signal or the vertical synchronizing signal is outputted from the computer 1 when the operation control signal OCS indicates an ON-mode, and that the horizontal synchronizing signal or vertical synchronizing signal is not outputted from the computer 1 when the operation control signal OCS indicates an OFF-mode. The operation control signal OCS outputted from the computer 1 is supplied to a frequency voltage converter 12 through a capacitor C2. An output terminal of the frequency voltage converter 12 is connected to a ground potential through a capacitor C3 and is also connected to a non-inverting input terminal (+) of a comparator OP1. The frequency voltage converter 12 outputs a voltage having a magnitude corresponding to the frequency of the input signal. Resistors R3 and R4 are serially connected between a voltage source Vcc and a ground potential to set a predetermined reference voltage, and are also connected to an inverting input terminal (−) of the comparator OP1. Again, the voltage source Vcc is supplied from the power supply unit 8. The reference voltage set by the resistors R3 and R4 is such that the comparator OP1 can determine the binary state of the operation control signal OCS. An output terminal of the comparator OP1 is connected to a ground potential through capacitor C4 and is also connected to an input terminal of the power controller 6. The output signal of the comparator OP1 is supplied to the power controller 6 as a power control signal PCS. When the operation control signal OCS is not received from the computer 1 the frequency voltage converter 12 has a zero output voltage, and accordingly, the power control signal PCS supplied from the comparator OP1 to the power controller 6 is in a logic state of zero. When an operation control signal OCS is received from the computer 1, the frequency voltage converter 12 outputs a voltage having a magnitude which corresponds to the frequency of the operation control signal OCS, and the power control signal PCS from the comparator OP1 is supplied to the power controller 6 in a logic state of 1. As described above, the control input detector 4 is able to determine the applicable control mode by comparing the operation control signal OCS generated from the computer 1 with a reference voltage.

Figure 4:
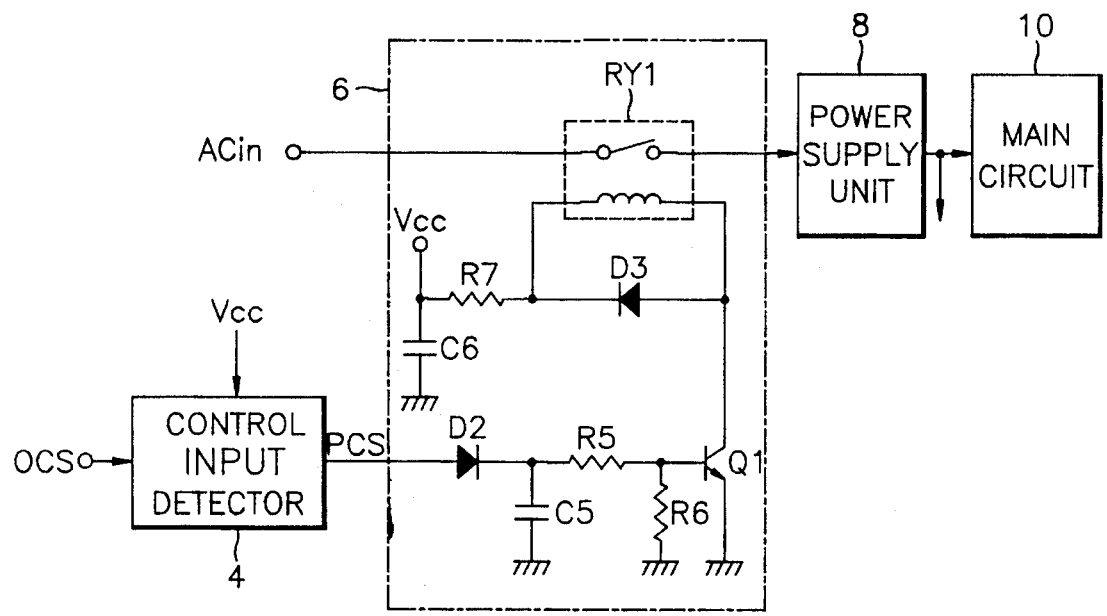
FIG. 4 is a detailed circuit diagram showing an embodiment of a power controller as shown in FIG. 1.

FIG. 4 shows a detailed circuit diagram of an embodiment of the power controller 6 in which input power ACin is either supplied to or cut off from the power supply unit 8 in response to the control mode indicated by the operation control signal OCS. The control input detector 4 determines the applicable control mode in dependence upon the operation control signal OCS, and generates a power control signal PCS corresponding to the determined control mode. In the power controller 6, the base of a transistor Q1 is connected through a diode D2 and a resistor R5 to an output terminal of the control input detector 4. The connection point between the cathode of diode D2 and the resistor R5 is connected to a ground potential through a capacitor C5. A resistor R6 is connected between the base of the transistor Q1 and a ground potential, and a collector of the transistor Q1 is connected to a voltage source Vcc through a diode D3 and a resistor R7. A capacitor C6 is connected between the voltage source Vcc and a ground potential. A driving coil of a relay RY1 is connected in parallel to both ends of the diode D3, and a switch of the relay RY1 is connected between input power ACin and the power supply unit 8. Again, the voltage source Vcc is supplied from the power supply unit 8. The switch of the relay RY1 is off when current flows through the driving coil, and is on when current does not flow through the coil.

Hereinafter, with reference to FIGS. 1 through 4, the operation of the embodiment of the power saving apparatus constructed according to the principles of the present invention is described in detail.

First, when the operation control signal OCS indicates an ON-mode, the control input detector 4 outputs a power control signal PCS in a logic state of zero. This causes transistor Q1 to turn off, so that the switch of the relay RY1 becomes ON. Accordingly, input power ACin is supplied to the power supply unit 8, which in turn transmits operating power to the main circuit 10.

On the other hand, when the operation control signal OCS indicates an OFF mode, the control input detector 4 outputs the power control signal PCS in a logic state of one. Thus, the transistor Q1 is turned on, and the switch of the relay RY1 becomes OFF. Accordingly, the input power ACin is prevented from being supplied to the power supply unit 8, and the main circuit receives no operating power.

Therefore, if the computer system has not been used for a predetermined period of time, the power supplied to the peripheral equipment 2 is stopped by the operation control signal OCS, thereby preventing needless power consumption.

Figure 5:
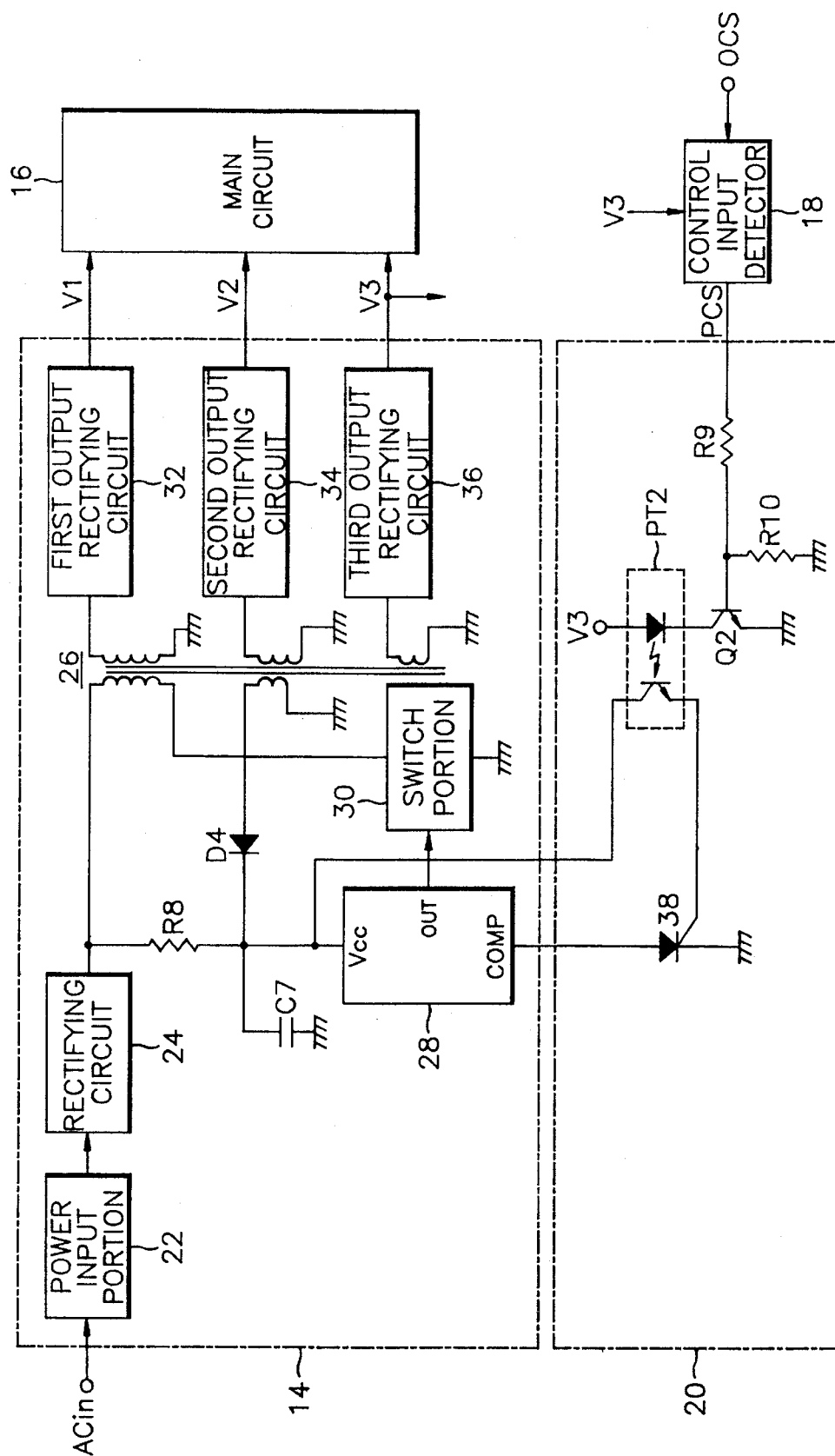
FIG. 5 is a detailed circuit diagram showing yet another embodiment of the power saving apparatus constructed according to the principles of the present invention.

FIG. 5 is a detailed circuit diagram showing another embodiment of a power saving apparatus for use in a computer's peripheral equipment constructed according to the principles of the present invention. Here, a power supply unit 14 is composed of a well-known multi-output SMPS (switching mode power supply) for performing a switching mode regulating operation, and only peripheral equipment is shown.

The power supply unit 14 generates power at three different voltage levels, and can generate even more if needed through a secondary side of a transformer 26. An input power portion 22 receives input power ACin and a rectifying circuit 24 rectifies the input power ACin. The rectified AC power is then supplied to a voltage terminal Vcc of a PWM (Pulse Width Modulation) controller 28 via a starting resistor R8, and is also supplied to a primary side of a transformer 26. Diode D4 and capacitor C7 are connected in parallel to a starting winding of the transformer 26, and the point connecting the diode D4 and the capacitor C7 is connected to the voltage terminal Vcc of the PWM controller 28 to supply operating power to the PWM controller 28. The PWM controller 28 generates a PWM signal and supplies the generated PWM signal to a switch portion 30 through an output terminal OUT. The PWM controller 28 uses a one chip integrated circuit such as the UC1842 manufactured by the U.S. manufacturer, the Unitrode Company. A switch portion 30 switches the primary side of the transformer 26 in response to the PWM signal. Power is induced in the secondary side of the transformer 26 by the switching operation of the switch portion 30. The induced power is rectified and smoothed through first, second, and third output rectifying circuits 32, 34 and 36, and is then supplied to the main circuit 16 as operating power. A first voltage output V1 from the first output rectifying circuit 32 is a high voltage output and can be used in the main circuit 16 to supply operating power to an analog circuit requiring a high voltage. A second voltage output V2 from the second output rectifying circuit 34 is a low voltage output and can be used in the main circuit 16 to supply operating power to an analog circuit requiring a low voltage. A third voltage output V3 from the third output rectifying circuit 36 is at a TTL level and is used to supply power to digital circuits within the main circuit 16, the control input detector 18 and the power controller 20.

The control input detector 18 detects a designated control mode from the operation control signal OCS and generates a power control signal PCS of a logic state corresponding to the detected control mode.

In the power controller 20, the base of a transistor Q2 is connected to an output terminal of the control input detector 18 through a resistor R9, and a resistor R10 is connected between the base of transistor Q2 and a ground potential. A light-emitting diode of a photo-coupler PT2 is connected between the collector of transistor Q2 and the third voltage output V3; and an anode of a silicon controlled rectifier (SCR) 38 is connected to a COMP terminal of the PWM controller 28. A cathode of the SCR 38 is connected to a ground potential, and a light- receiving transistor of the photo-coupler PT2 is connected between the voltage terminal Vcc of the PWM controller 28 and a gate of the SCR 38.

Hereinafter, the operation of the embodiment shown in FIG. 5 of the present invention is described in detail.

When the operation control signal OCS reflects an ON-mode, the control input detector 18 outputs the power control signal PCS in a logic state of zero as described above. This causes transistor Q2 and the light-emitting diode of the photo-coupler H2 to turn off. The SCR 38 is also in an OFF state so that the PWM controller 28 generates a PWM signal. Accordingly, the first, second and third output rectifying circuits 32, 34 and 36 generate first voltage V1, second voltage V2 and third voltage V3 to be supplied to the computer's peripheral equipment.

If the state of the operation control signal OCS reflects an OFF-mode, the control input detector 18 outputs the power control signal PCS in a logic state of one. Hence, transistor Q2 turns on and the light-emitting diode and the light-receiving transistor of the photo-coupler PT2 reflect the ON state. The gate of SCR 38 is triggered to reflect the ON state, so that the COMP terminal of the PWM controller 28 is connected to a ground potential. Thus, the PWM controller 28 shuts down and stops generation of the PWM signal. Accordingly, as a PWM signal is not generated in the PWM controller 28, first, second and third voltages, V1, V2 and V3 are not generated in the first, second and third output rectifying circuits 32, 34 and 36.

Therefore, when the computer system has not been used for a predetermined period of time, power supplied to the computer's peripheral equipment is cut off by the operation control signal OCS, thereby preventing needless power consumption. This stopped state is continuously maintained until the SCR 38 turns off. Thus, to resupply power to the computer's peripheral equipment, input power ACin should be turned off, then on.

As described above, stopping the supply of power to a computer's peripheral equipment in response to an operation control signal OCS indicative of an OFF-mode can prevent needless power consumption, but the user should switch the input power ACin off, then on, after stopping the power.

Figure 6:
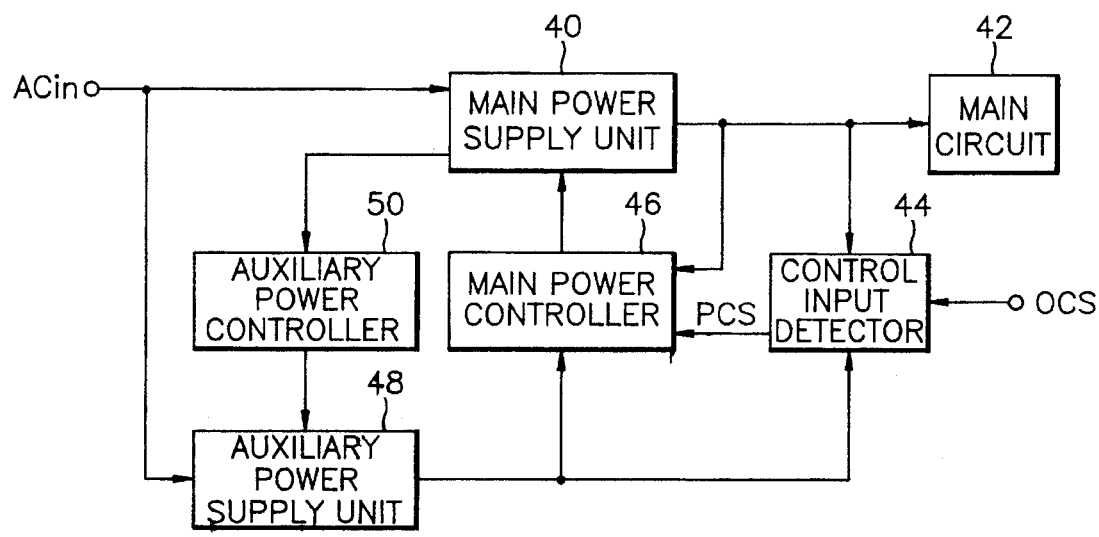
FIG. 6 is a block diagram showing still another embodiment of a power saving apparatus constructed according to the principles of the present invention.

In FIG. 6, a main power supply unit 40 generates and supplies various levels of operating power to a main circuit 42, a control input detector 44 and a main power controller 46 from input power ACin. The control input detector 44, as shown in FIG. 2 or FIG. 3, detects a control mode from the operation control signal OCS, and generates a power control signal PCS in a logic state corresponding to the detected control mode. The main power controller 46 receives the power control signal PCS to control the operation of the main power supply unit 40 in response to the control mode detected in the control input detector 44. While the main power supply unit 40 is operating, if an OFF-mode is detected, the operation of the main power supply unit 40 is stopped. If while the main power supply unit 40 is in an OFF state, an ON-mode is detected, the operation of the main power supply unit 40 is restarted. An auxiliary power supply unit 48 generates the operating power for the control input detector 44 and the main power controller 46 from input power ACin when the main power supply unit 40 is in an OFF state. An auxiliary power controller 50 detects the operational state of the main power supply unit 40, and stops operation of the auxiliary power supply unit 50 if the main power supply unit 40 is in an ON state. Similarly, the auxiliary power controller 50 restarts operation of the auxiliary power supply unit 50 if the main power supply unit 40 is in an OFF state.

Figure 7:
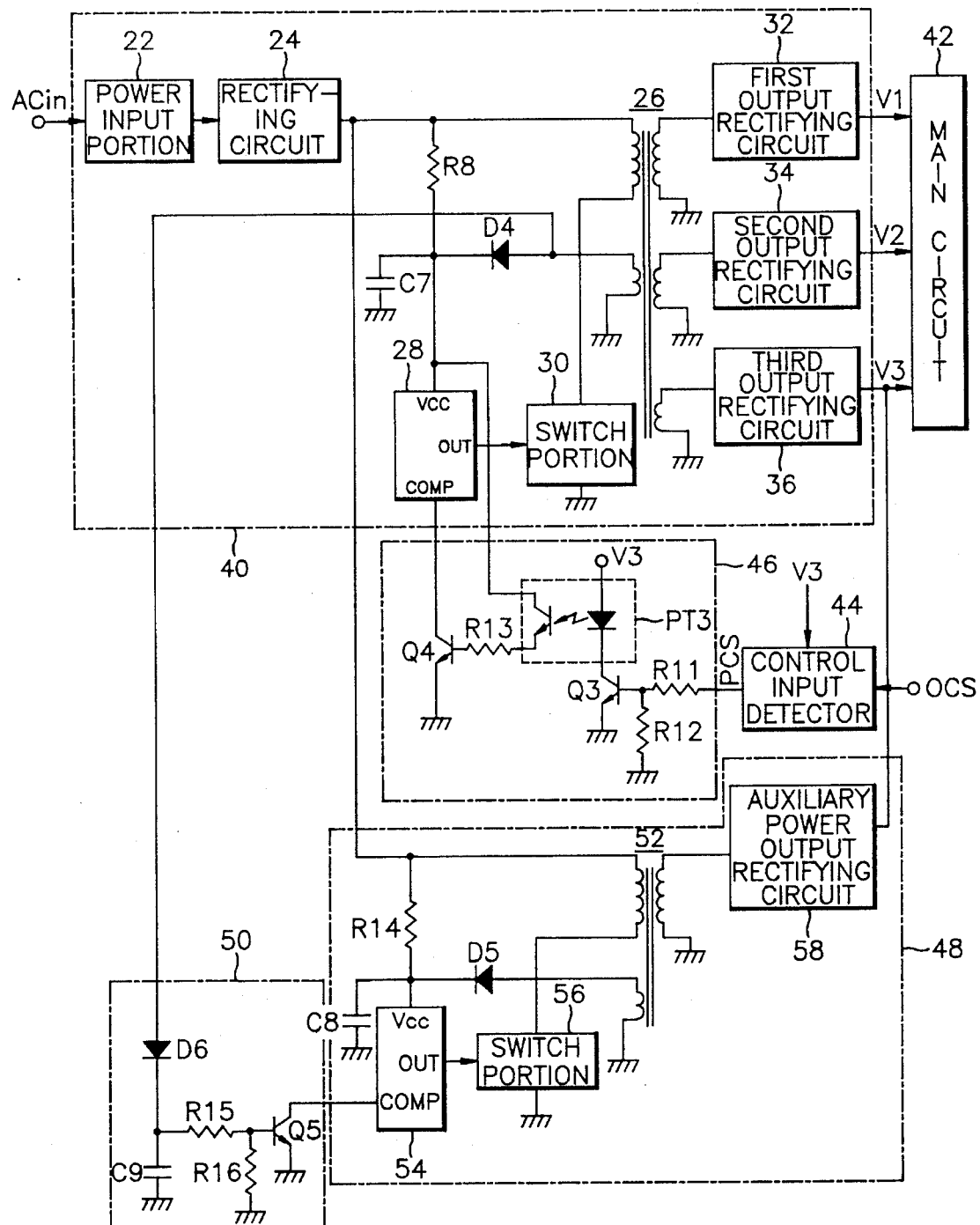
FIG. 7 is a detailed circuit diagram of FIG. 6.

FIG. 7 shows a detailed circuit diagram of FIG. 6. The main power supply unit 40 of FIG. 7 has the same constitution as the aforementioned power supply unit 14 of FIG. 5. Accordingly, reference numerals of respective elements of the main power supply unit 40 are identical to the reference numerals of respective elements of the power supply unit 14 of FIG. 5. The main power supply unit 40 generates the same first voltage V1, second voltage V2 and third voltage V3 as those of the power supply unit 14 of FIG. 5.

In the main power controller 46, the base of a transistor Q3 is connected to an Output terminal of the control input detector 44 through a resistor R11, and a resistor R12 is connected between the base of transistor Q3 and a ground potential. A light-emitting diode of a photo-coupler PT3 is connected between the collector of transistor Q3 and a third voltage V3, and a transistor Q4 is connected to the COMP terminal of the PWM controller 28 and a ground potential. A light-receiving transistor of the photo-coupler PT3 and a resistor R13 are connected between the voltage terminal Vcc of the PWM controller 28 and the base of transistor Q4.

The auxiliary power supply unit 48 supplies DC power to a rectifying circuit 24. The rectifying circuit 24 then sends the output to voltage terminal Vcc of the PWM controller 54 via a starting resistor R14 and simultaneously, to the primary side of a transformer 52. The PWM controller 54 then generates a PWM signal, which is supplied to a switch 56 through an output terminal OUT. The PWM controller 54 uses a one-chip integrated circuit such as the UC1842, like the PWM controller 28. A series connected diode D5 and capacitor C8 are connected in parallel to a starting winding of the transformer 52, and also connected to voltage terminal Vcc of the PWM controller 54, to supply operating power to the PWM controller 54. A switch portion 56 switches the primary side of the transformer 52 in response to the PWM signal. Power is induced in the secondary side of the transformer 52 by the switching operation of the switch portion 56, and the induced power is rectified and smoothed through the auxiliary power output rectifying circuit 58, and is then supplied as a third voltage V3. The third output rectifying circuit 36 of the main power supply unit 40 is connected to the output terminal of the auxiliary power output rectifying circuit 58 of the auxiliary power supply unit 48. Accordingly, third voltage output V3 of the main power supply unit 40 and third voltage output V3 of the auxiliary power supply unit 48 both supply voltage to the main circuit 42 and are also used to supply operating power to the control input detector 44 and the main power controller 46.

In the auxiliary power controller 50, diode D6 and capacitor C9 are serially connected between the starting winding of a transformer 26 and a ground potential, and a connecting point between diode D6 and capacitor C9 is connected to the base of a transistor Q5 through a resistor R15. The transistor Q5 is connected between the COMP terminal of the PWM controller 54 and a ground potential, and a resistor R16 is connected between the base of transistor Q5 and a ground potential.

Hereinafter, the operation of FIG. 7 constructed according to the principles of the present invention is described in detail.

First, when the operation control signal OCS indicates an ON-mode, the control input detector 44 outputs the power control signal PCS in a logic state of zero. This turns transistor Q3 into an OFF state and accordingly the light-emitting diode of the photo-coupler PT3 is also turned off. The transistor Q3 keeps the OFF state, so that the PWM controller 28 generates a PWM signal. Thus, the first voltage V1, the second voltage V2 and the third voltage V3 are generated in the first, second and third output rectifying circuits 32, 34 and 36 and are supplied as operating power for the computer's peripheral equipment.

At this time, a pulse signal induced in the starting winding of the transformer 26 by the switching action of the switch portion 30 is rectified and smoothed by diode D6 and capacitor C9, causing a logic state of one to appear at the connection between diode D6 and capacitor C9. Accordingly, since the transistor Q5 is turned on and the COMP terminal of the PWM controller 54 is connected to a ground potential, the PWM controller 54 is shut down and generation of the PWM signal is stopped. Therefore, while the main power supply unit 40 is in normal operation, the operation of the auxiliary power supply unit 48 is stopped, thereby preventing interference between the outputs of the third output rectifying circuit 36 and the auxiliary power output rectifying circuit 58. If the interference between the outputs is not a significant problem, one may choose not to use the auxiliary power controller 50.

As described above, during normal operation, if the operation control signal OCS changes state to indicate an OFF-mode, the control input detector 44 outputs the power control signal PCS in a logic state of one. Then, the transistor Q3 is turned on and the light-emitting diode and the light-receiving transistor of the photo-coupler PT3 reflect the ON state. Thus, the transistor Q4 is turned on and the COMP terminal of the PWM controller 28 is connected to a ground potential, to be shut down. Hence, the generation of the PWM signal is stopped. As the PWM signal is not generated in the PWM controller 28, first voltage V1, second voltage V2 and third voltage V3 are not generated in the first, second and third output rectifying circuits 32, 34 and 36.

Accordingly, if the computer system has not been used for a predetermined period of time, the supply of power to the computer's peripheral equipment is stopped by the control mode indicated by the operation control signal OCS, thereby preventing needless power consumption.

At this time, there is no pulse signal appearing in the starting winding of the transistor 26, so that the voltage level at the connection point between diode D6 and capacitor C9 appears as a logic state of zero. Transistor Q5 then turns off, so that the PWM controller 54 generates a PWM signal. Thus, the auxiliary power output rectifying circuit 58 generates power which is supplied to the control input detector 44 and the main power controller 46.

While the supply of power to the computer's peripheral equipment is stopped, if the operation control signal OCS changes its state to indicate an ON-mode, the control input detector 44 outputs the power control signal PCS as a logic state of zero. This causes transistor Q3 and the light-emitting diode of the photo-coupler PT3 to turn off. Accordingly, transistor Q4 also maintains an OFF state, and the PWM controller 28 generates a PWM signal, so that first, second and third output rectifying circuits 32, 34 and 36 generate first voltage V1, second voltage V2 and third voltage V3 to be supplied as operating power to the peripheral equipment.

Even if the supply of power to the peripheral equipment is stopped, operating power is continuously supplied to the control input detector 44 and the main power controller 46, so that normal operation can be maintained until the operation control signal OCS changes its state to indicate an ON-mode.

Figure 8:
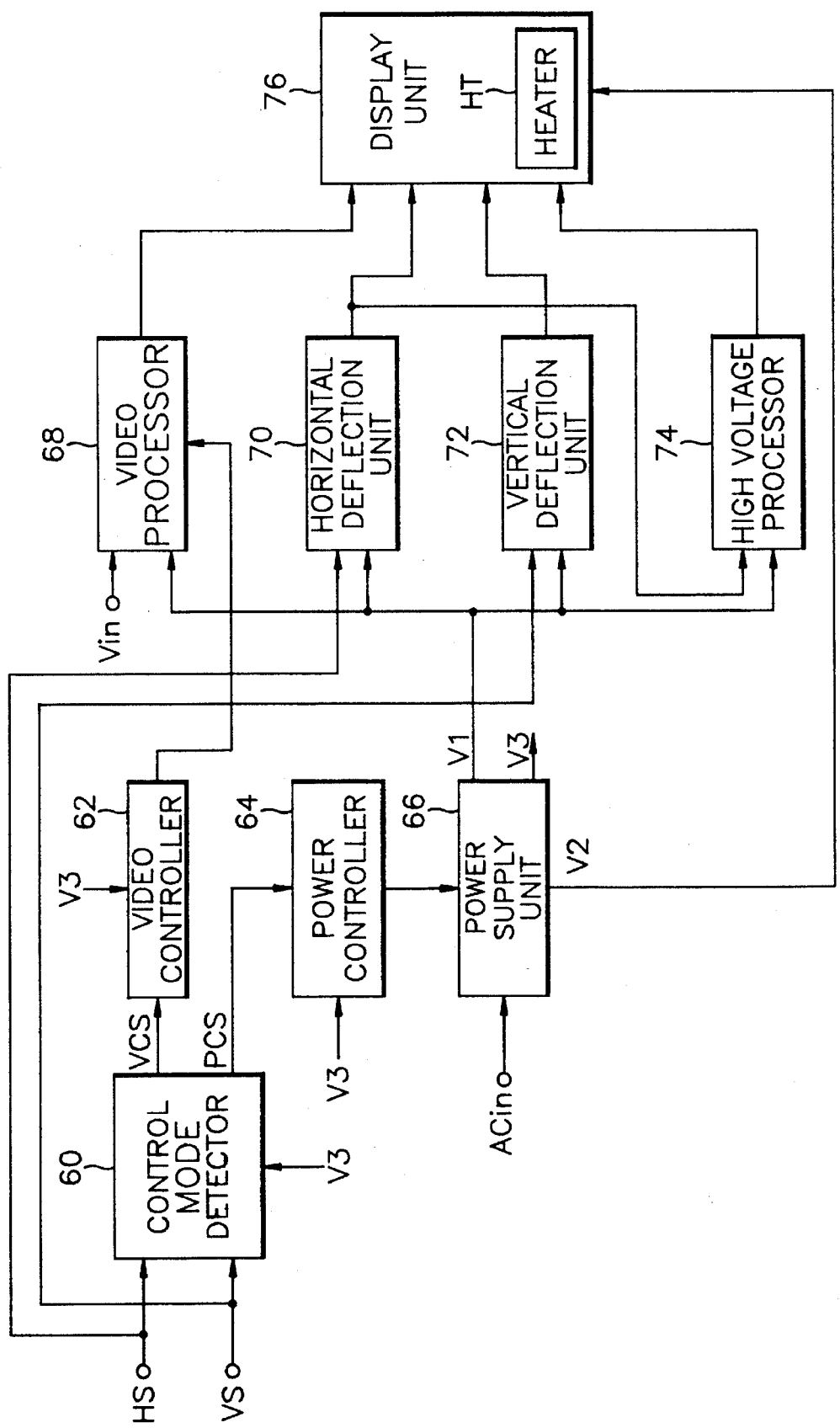
FIG. 8 is a block diagram showing an embodiment of the power saving apparatus for use in a monitor according to the principles of the present invention.

FIG. 8 is a block diagram of an embodiment of a power saving apparatus for use in a computer's monitor. In FIG. 8, horizontal synchronizing signal HS and vertical synchronizing signal VS are received by control mode detector 60. Here, the computer 1 selectively supplies horizontal synchronizing signal HS and vertical synchronizing signal VS to operate the monitor in any one of an ON-mode, a Standby-mode or an OFF-mode. An ON-mode represents normal supply of power to the computer's monitor, and a Standby-mode indicates a muting of a video signal processed in the video processor 68, so as not to display the video signal. An OFF-mode indicates a stoppage of power to the monitor. It is described in *DPMS (Display Power Management Signaling) Proposal* issued and distributed on Jan. 23, 1993 in the U.S. by VESA (Video Electronics Standards Association) that the computer 1 generates the operation control signal OCS in the form of a horizontal synchronizing signal HS and a vertical synchronizing signal VS in order to control a monitor. In the aforementioned reference, an ON-mode represents an ON state where both the horizontal synchronizing signal HS and the vertical synchronizing signal VS appear as pulse outputs, and the Standby-mode represents a standby state where only the vertical synchronizing signal VS appears as a pulse output. An OFF-mode represents an OFF state, where pulse outputs from neither the horizontal synchronizing signal HS nor the vertical synchronizing signal VS appear. In the ON-mode and the OFF-mode, the present embodiment operates the same as the aforementioned reference. In the Standby-mode, however, the present embodiment generates either the horizontal synchronizing signal HS pulse or the vertical synchronizing signal VS pulse. Also, the control mode is sequentially converted in the order of ON-mode, Standby-mode, OFF-mode, each corresponding to the time period for which the computer system is not in use.

Accordingly, in the present embodiment, a control mode detector 60 detects the presence of the horizontal synchronizing signal HS and the vertical synchronizing signal VS supplied from the computer 1. The control mode detector 60 then decodes the detected signal, thereby detecting the applicable control mode. The control mode detector 60 generates a video control signal VCS for controlling video processing and a power control signal PCS for controlling the supply of power, corresponding to the detected control mode. A power supply unit 66 generates a first voltage V1, a second voltage V2 and a third voltage V3 from an input power source ACin. The first voltage V1 is supplied to a video processor 68, a horizontal deflection unit 70, a vertical deflection unit 72 and a high voltage processor 74 and may have a magnitude of eight Volts, twelve Volts, sixteen Volts, twenty-five Volts, eighty-five Volts, two hundred Volts, etc. The second voltage V2 is used to operate a heater HT of a display unit 76 and has a magnitude of six volts. The third voltage V3 is at a TTL level and operates the control mode detector 60 and a power controller 64. A CRT (cathode ray tube) display is used as the display unit 76. The power controller 64 receives a power control signal PCS from the control mode detector 60, corresponding to the detected control mode, to maintain normal operation of or to temporarily stop operation of the power supply unit 66. The power controller 64 and the power supply unit 66 have the same constitution as the power controller 20 and the power supply unit 14 of FIG. 5, respectively. The video processor 68, the horizontal deflection unit 70, the vertical deflection unit 72, and the high-voltage processor 74 drive the display unit 76. The video processor 68 processes a video signal Vin supplied from the computer 1, and supplies the processed signal to the display unit 76, thereby displaying an image. The horizontal deflection unit 70, by being synchronized with the horizontal synchronizing signal HS supplied from the computer 1, generates and amplifies the horizontal deflection signal. The horizontal deflection unit 70 then supplies the amplified signal to the display unit 76, thereby performing horizontal deflection and also generating a high voltage needed for the display unit 76. The vertical deflection unit 72, by being synchronized to the vertical synchronizing signal VS supplied from the computer 1, generates and amplifies the vertical deflection signal. The vertical deflection unit 72 then supplies the amplified signal to the display unit 76, thereby performing vertical deflection. The high voltage processor 74 processes a voltage generated in the horizontal deflection unit 70 and supplies the processed voltage to the display unit 76. The video controller 62 receives a video control signal VCS from the control mode detector 60, and mutes the video signal processed in the video processor 68 if the control mode detected in the control mode detector 60 indicates a Standby-mode.

Figure 9:
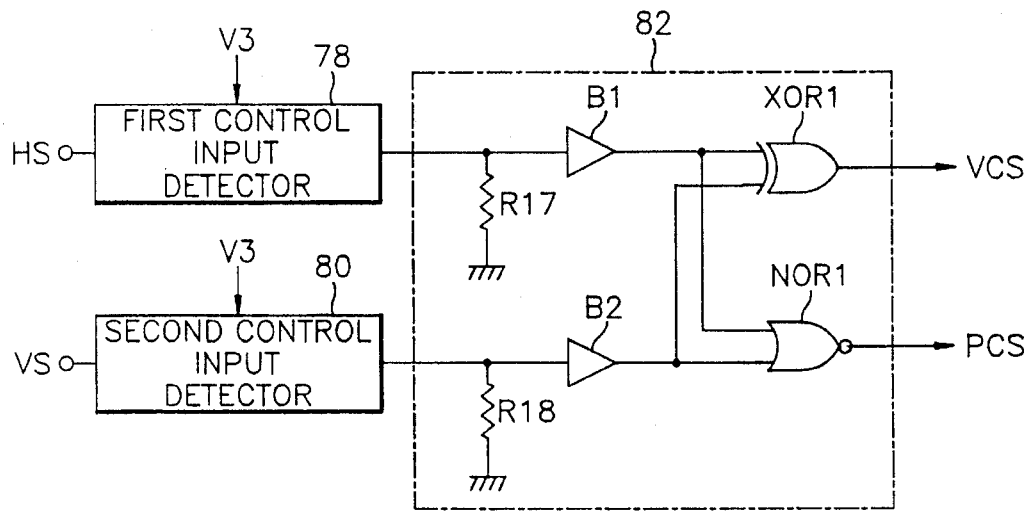
FIG. 9 is a detailed circuit diagram of the control mode detector as shown in FIG. 8.

FIG. 9 illustrates a detailed circuit diagram of the control mode detector 60. In FIG. 9, first and second control input detectors 78 and 80 have the same constitution as those in FIG. 3, respectively and are operated by third voltage V3 supplied from the power supply unit 66. The first control input detector 78 is connected to a horizontal synchronizing signal output terminal of the power supply unit 66, and the second control input detector 80 is connected to a vertical synchronizing signal output terminal of the computer 1. The first control input detector 78 generates a logic state of 1 when pulses of the horizontal synchronizing signal HS are received, and generates a logic state of zero when pulses of the horizontal synchronizing signal HS are not received. The second control input detector 80 generates a logic state of one when the pulses of the vertical synchronizing signal VS are received and generates a logic state of zero when pulses of the vertical synchronizing signal VS are not received. In a mode decoder 82, first inputs of an exclusive OR gate XOR1 and a NOR gate NOR1 are connected to an output terminal of the first control input detector 78 through a buffer B1, and second inputs of the exclusive OR gate XOR1 and the NOR gate NOR1 are connected to an output terminal of the second control input detector 80 through a buffer B2. Resistors R17 and R18 are respectively connected between output terminals of the first and second control input detectors 78 and 80 and a ground potential. An output of the exclusive OR gate XOR1 is supplied to the video controller 62 as a video control signal VCS and the output of NOR gate NOR1 is supplied to the power controller 64 as a power control signal PCS. The respective states of the control signals supplied from the mode decoder 82 are as shown in Table 1 as follows:

TABLE 1

| Control mode | HS | VS | VCS | PCS |
| --- | --- | --- | --- | --- |
| ON mode | Pulses | Pulses | "0" | "0" |
| Standby mode | Pulses | No Pulses | "1" | "0" |
| Suspensory mode | No Pulses | Pulses | "1" | "0" |
| OFF mode | NO Pulses | No Pulses | "0" | "1" |

Figure 10:
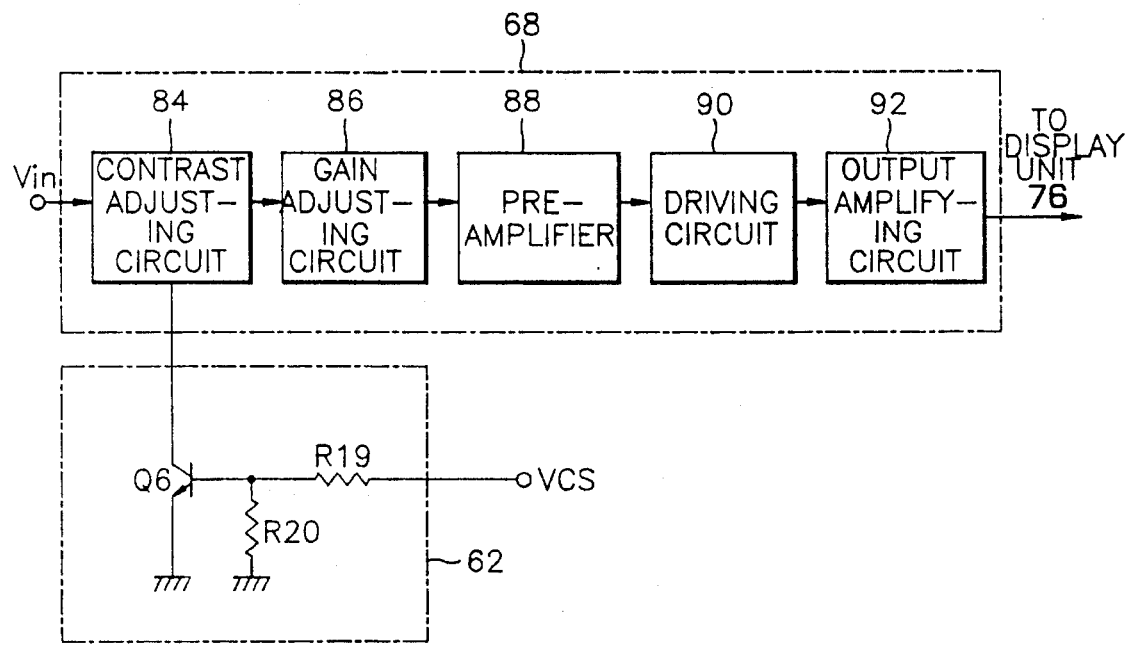
FIG. 10 is a detailed circuit diagram of a video controller and a video processor as shown in FIG. 8.

FIG. 10 illustrates a detailed circuit diagram of the video controller 62 and the video processor 68. The video processor 68 is a well-known device composed of a contrast adjusting circuit 84, a gain adjusting circuit 86, a preamplifier 88, a driving circuit 90 and an output amplifying circuit 92.

The following example illustrates the processing of a primary color signal included in a video signal Vin. Contrast of the video signal Vin received from the computer 1 is adjusted in the contrast adjusting circuit 84 and its gain is adjusted in the gain adjusting circuit 86. The video signal is then amplified in the preamplifier 88 and supplied to the display unit 76 through the driving circuit 90 and the output amplifying circuit 92. A one chip integrated circuit such as the LM1205N manufactured in the U.S. by the National Semiconductor Company is preferably used as the contrast adjusting circuit 84. The contrast adjusting circuit 84 has a blank terminal BLK, and mutes a video signal by dropping the level of the video signal to a black and white level when the blank terminal BLK is connected to a ground potential. Hence, display of an image on the display unit 76 is terminated. Here, instead of controlling the blank terminal BLK of the contrast adjusting circuit 84, a voltage value for brightness G1 to be supplied to display unit 76 may be controlled. In the video controller 62, the base of a transistor Q6 receives a video control signal VCS from the control mode detector 60 through a resistor R19. The collector of transistor Q6 is connected to the blank terminal BLK of the contrast adjusting circuit 84, and the emitter of transistor Q6 is connected to a ground potential. A resistor R20 is connected between the base of transistor Q6 and a ground potential. The transistor Q6 is switched according to the logic state of the video control signal VCS.

Hereinafter, with reference to FIGS. 8 through 10, the operation of a power saving apparatus for use in the monitor of a computer system, constructed according to the principles of the present invention is disclosed in detail.

First, an ON mode is described. As shown in table 1, when pulses of a horizontal synchronizing signal HS and a vertical synchronizing signal VS appear, first and second control input detectors 78 and 80 output a logic state of one, and an output video control signal VCS of the exclusive OR gate XOR1 and an output power control signal PCS of the NOR gate NOR1 output a logic state of zero. Under these conditions, the power controller 64 and the power supply unit 66 operate as described with reference to FIG. 5, so that the power supply unit 66 generates first voltage V1, second voltage V2 and third voltage V3 from the input source ACin. Also, transistor Q6 of the video controller 62 is turned off, so that the video signal is not muted and is supplied to the display unit 76. Accordingly, the monitor performs normal operation.

Next, a Standby-mode is described. As shown in table one, only one pulse of either the horizontal synchronizing signal HS or the vertical synchronizing signal VS appears. Under these conditions, the output video control signal VCS of the exclusive OR gate XOR1 reflects a logic state of one and the output power control signal PCS of the NOR gate NOR1 reflects a logic state of zero. Thus, the power controller 64 and the power supply unit 66 operate as described in FIG. 5, so that the power supply unit 66 generates first voltage V1, second voltage V2 and third voltage V3 from input source ACin. The transistor of the video controller 62 is turned on, and then connects the blank terminal BLK of the contrast adjusting circuit 84 to a ground potential, thereby muting the video signal. Accordingly, an image does not appear on the CRT of the display unit 76, and power normally consumed by the video processor 68 is saved. At this time, the supply of power to the monitor is normal, so that normal operation can be performed whenever the control mode is converted into an ON mode.

Thirdly, an OFF mode is described. As shown in table 1, no pulses of either the horizontal synchronizing signal HS or the vertical synchronizing signal VS appear. Thus, the output video control signal VCS of the exclusive-OR gate XOR1 and the output power control signal PCS of the NOR gate NOR1 reflect a logic state of one. In this state, the power controller 64 stops operation of the power supply unit 66, thereby cutting off the generation of first voltage V1, second voltage V2 and third voltage V3 in the power supply unit 66. Therefore, if the computer system has not been used for a predetermined period of time, the supply of power to the monitor is stopped. Under these circumstances, since operating power is not supplied to the control mode detector 60 and power controller 64, the monitor can only be operated if the user turns the power switch off, then on. Accordingly, needless power consumption can be prevented by controlling the supply of power to the monitor during the time period in which the computer system is not being used.

Figure 11:
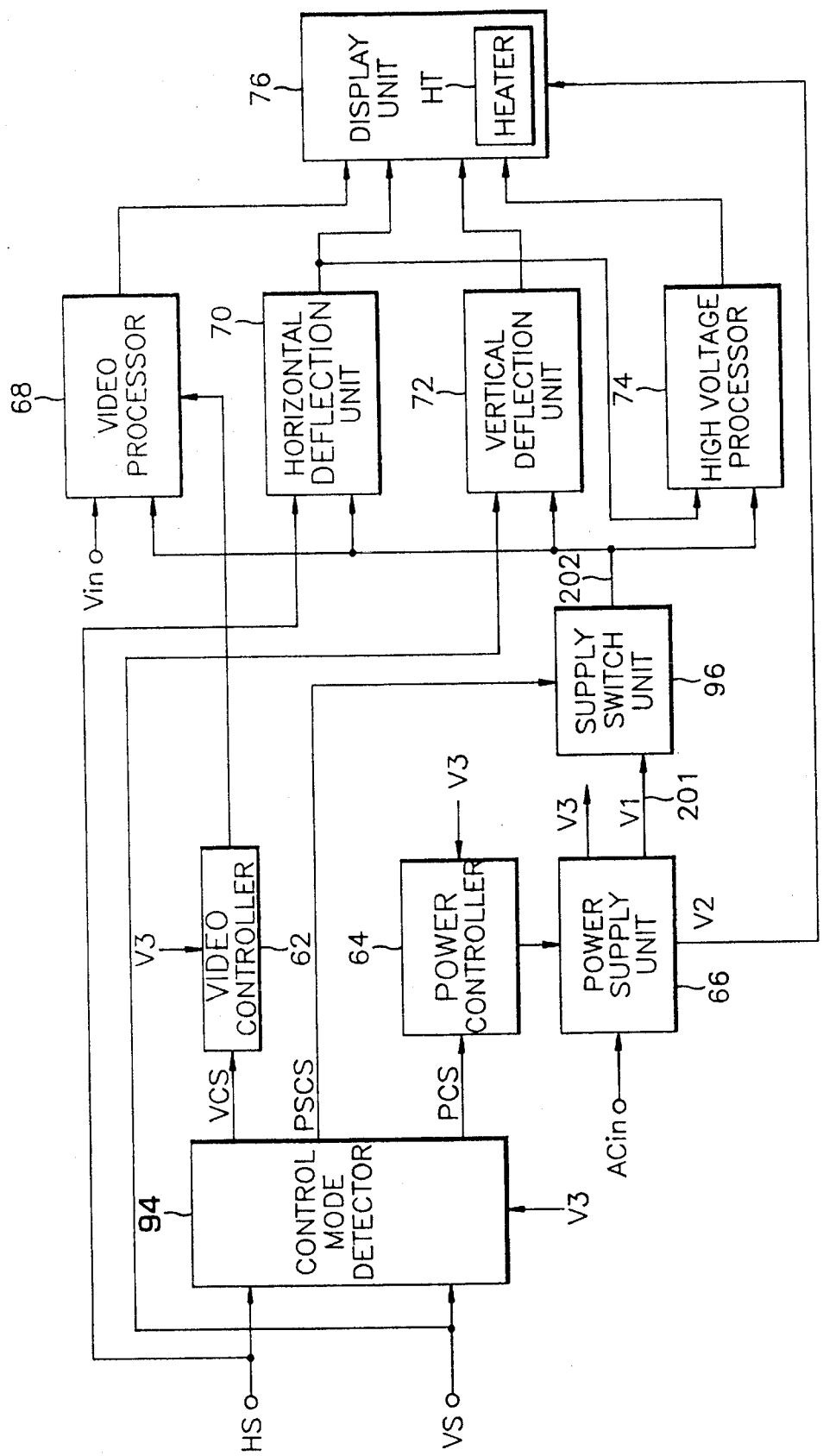
FIG. 11 is a block diagram showing another embodiment of the power saving apparatus for use in a monitor constructed according to the principles of the present invention.

FIG. 11 illustrates a block diagram of another embodiment of a power saving apparatus for use in a computer monitor constructed according to the principles of the present invention. In FIG. 11, the video controller 62, the power controller 64, the power supply unit 66, the video processor 68, the horizontal deflection unit 70, the vertical deflection unit 72, the high voltage processor 74, and the display unit 76 have the same constitution and reference numerals as those shown in FIG. 8. A control mode detector 94 receives a horizontal synchronizing signal HS and a vertical synchronizing signal VS as an operation control signal OCS from the computer 1. The computer 1 selectively supplies a horizontal synchronizing signal HS and a vertical synchronizing signal VS to the monitor to operate the monitor in either an ON mode, a Standby mode, a Suspensory mode or an OFF mode. The ON mode, the Standby mode, and the OFF mode are the same as those discussed in reference to FIG. 8. In the Suspensory mode, only the second voltage V2 for operating a heated HT of the display unit 76 and the third voltage V3 for operating the control mode detector 94 and the power controller 64 are supplied. First voltage V1 is not generated in the Suspensory mode.

The control modes are described in the aforementioned *DMPS Proposal*, as follows. The ON mode is a state where pulse outputs of both the horizontal synchronizing signal HS and the vertical synchronizing signal appear. The Standby mode is a state where only the pulse output of the vertical synchronizing signal VS appears. The Suspensory mode is a state where only a pulse output of the horizontal synchronizing signal HS appears, and the OFF mode is a state where no pulse outputs of either the horizontal synchronizing signal HS of the vertical synchronizing signal VS appears. The control modes are sequentially converted in the following order: ON mode, Standby mode, Suspensory mode, OFF mode, each corresponding to the period of time during which the computer system has not been used.

Accordingly, the control mode detector 94 detects the presence or absence of input of the horizontal synchronizing signal HS and the vertical synchronizing signal VS from the computer 1 and then decodes the detected signal, thereby detecting the applicable control mode. The control mode detector 94 generates a video control signal VCS for controlling video processing, a power switching control signal PSCS for controlling the supply of first voltage V1 and a power control signal PCS for controlling the supply of power, in response to the detected control mode. A supply to the video processor 68, the horizontal deflection unit 70, the vertical deflection unit 72 and the switch unit 96 receives a power switching control signal PSCS, thereby receiving first voltage V1 through input line 201 and supplying first voltage V1 high voltage processor 74 through output line 202 or cutting off the first voltage V1 in response to the control mode detected in the control mode detector 94.

Figure 12:
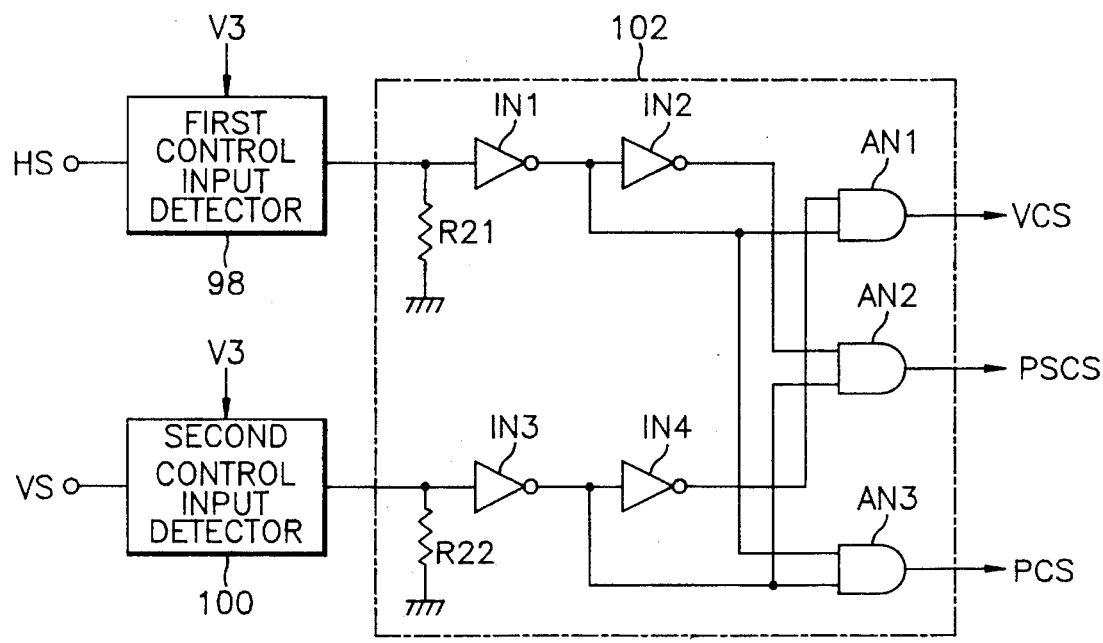
FIG. 12 is a detailed circuit diagram of a control mode detector as shown in FIG. 11.

FIG. 12 illustrates a detailed circuit diagram of the control mode detector 94. In FIG. 12, first and second control input detectors 98 and 100 have the same constitution as mentioned in reference to FIG. 3, and are operated by third voltage V3 supplied from the power supply unit 66. The first control input detector 98 is connected to the horizontal synchronizing signal output terminal of the computer 1 and the second control input detector 100 is connected to the vertical synchronizing signal output terminal of the computer 1. The first control input detector 98 generates a logic state of 1 when pulses of the horizontal synchronizing signal HS are received, and generates a logic state of zero when pulses of the horizontal synchronizing signal HS are not received. The second control input detector 200 generates a logic state of one when pulses of the vertical synchronizing signal VS are received, and generates a logic state of zero when pulses of the vertical synchronizing signal VS are not received. In a mode detector 102, inverter IN1 and IN2 are serially connected to an output terminal of the first control input detector 98 and inverter IN3 and IN4 are serially connected to an output terminal of the second control input detector 100. An AND gate AN1 is connected to output terminals of the inverter IN1 and IN4, a second AND gate AN2 is connected to output terminals of the inverter IN2 and IN 3, and a third AND gate AN3 is connected to output terminals of the inverter IN1 and IN3. Resistors R21 and R22 are respectively connected between the first and second control input detectors 98 and 100 and a ground potential. An output signal of the second AND gate AN2 is supplied to the video controller 62 as a video control signal VCS, an output signal of the second AND gate AN2 is supplied to the supply switch unit 96 as a power switching control signal PSCS, as an output signal of the third AND gate AN3 is supplied to the power controller 64 as a power control signal PCS. Accordingly, respective states of control signal supplied from the mode detector 102 are as shown in table 2 below.

TABLE 2

| Control mode | HS | VS | VCS | PSCS | PCS |
| --- | --- | --- | --- | --- | --- |
| ON mode | Pulses | Pulses | "0" | "0" | "0" |
| Standby mode | No Pulses | Pulses | "1" | "0" | "0" |
| Suspensory mode | Pulses | No Pulses | "0" | "1" | "0" |
| OFF mode | No Pulses | No Pulses | "0" | "0" | "1" |

Figure 13:
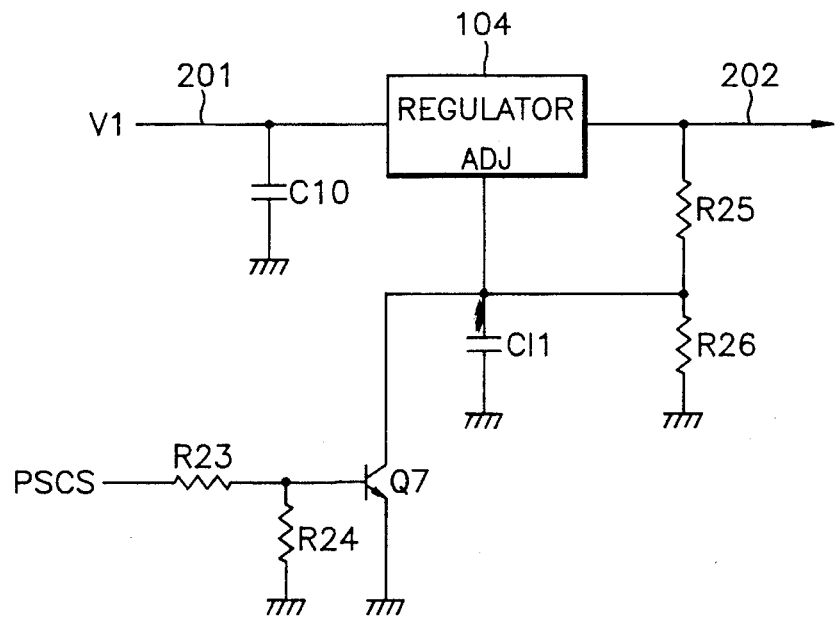
FIG. 13 is a detailed circuit diagram of a supply switch unit as shown in FIG. 11.

FIG. 13 illustrates a detailed circuit diagram of the supply switch unit 96. In FIG. 13, a regulator 104 receives a first voltage V1 from the power supply unit 66 through an input line 201 and supplies a constant voltage to the video processors 68, the horizontal deflection unit 70, the vertical unit 72 and the voltage processor 74 through an output line 202. The regulator 104 is preferably an LM317 model manufactured by U.S. Motorola Inc., and has an adjust terminal ADJ. When the adjust terminal ADJ is grounded, the regulator 104 is shut down, thereby cutting off the first voltage supply V1 to the video processor 68, with the horizontal deflection unit 70, the vertical deflection unit 72, and the high voltage processor 74. A capacitor C10 is connected between an input terminal the regulator 104 and a ground potential, and resistors R25 and R26 are serially connected between output terminal of the regulator 104 and a ground potential. A common connection between resistors R25 and R26 is connected to the adjust terminal ADJ of the regulator 104, and a capacitor C11 is connected between the adjust terminal ADJ of the regulator 104 and a ground potential. The collector of a transistor Q7, which receives a power switching control signal PSCS through a resistor R23 in its base, is connected to the adjust terminal ADJ of the regulator 104. A resistor R24 is connected between the base of the transistor Q7 and a ground potential.

Hereinafter, with reference to FIGS. 11 through 13, the operation of power saving apparatus for use in a computer monitor constructed according to another embodiment of the present invention is described in detail.

First, the ON mode is described. As shown in table 2, the pulses of both the horizontal synchronizing signal HS and the vertical synchronizing VS appear. Then the video control signal VCS, the power switching control signal PSCS and the power control signal PCS of the control mode detector 94 all reflect a logic state of zero. Accordingly, the power controller 64 and the power supply unit 66 operate normally as described in the aforementioned FIG. 5, so that the power supply unit 66 generates first voltage V1, second voltage V2 and third voltage V3 from input source ACin. Also, the transistor 06 of the video controller 62 is turned off, so that a video signal is not muted and is supplied normally to the display unit 76. Similarly, the transistor Q7 of the supply switch unit 96 is turned off, so that the regulator 104 also operates in a normal state. Therefore, the monitor performs normal operation.

Secondly, a Standby mode is described. As shown in table 2, only pulses of the vertical synchronizing signal VS appear during the Standby mode. This causes the video control signal VCS of the control mode detector 94 to reflect a logic state of 1, and the power switching control signal PSCS and the power control signal PSC to reflect a logic state of zero. The power controller 64 and the power supply unit 66 operate normally, so that the power supply unit 66 generate first voltage V1, second voltage V2 and third voltage V3 from input source ACin. The transistor Q6 of the video controller 62 is turned on, and then connects the blank terminal BLK of the contrast adjusting circuit 84 to a ground potential, thereby muting the video signal. Accordingly, images do not appear on the CRT of the display unit 76, and power normally consumed in the video processor 68 can be saved during this time. The supply of power to the computer's monitor is normal, so that its normal operation can be resumed whenever an ON mode is activated.

Thirdly, a Suspensory mode is described. As shown in Table 2, only pulses of the horizontal synchronizing signal HS appear in the Suspensory mode. This causes the video control signal VCS and the power control PCS of the control mode detector 94 to both reflect a logic state of zero, and power switching control signal PSCS to reflect a logic state of one. The power controller 64 and the power supply unit 66 operate normally as described in reference to FIG. 5, so that the power supply unit 66 generates first voltage V1, second voltage V2 and third voltage V3 from input power source ACin. The transistor Q7 of the supply switch unit 96 is turned on, to shut down the regulator 104. Thus, the supply of operating power to the video processor 68, the horizontal deflection unit 70, the vertical deflection unit 72 and high voltage processor 74 is stopped. Accordingly, power is saved since power is supplied only to the control mode detector 94, the power controller 64 and the heater HT. Also at this time, since preheating is performed by supplying operating power to the heater HT and the power supply unit 66 is operating normally, normal operation can be resumed whenever the ON mode is activated.

Fourthly, the OFF mode is described. As shown in table 2, no pulses of either the horizontal synchronizing signal HS or the vertical synchronizing signal VS appear in the OFF mode. Therefore, the video control signal VCS and the power switching control signal PSCS of the control mode detector 94 all reflect a logic state of zero and the power control signal PCS reflects a logic state of one. Accordingly, the power controller 64 stops operation of the power supply unit 66, thereby stopping the generation of first voltage V1, second voltage V2 and third voltage V3 in power supply unit 66. Thus, if the computer system has not been used for a predetermined period of time, the supply of power to the computer's monitor is stopped. Also at this time, since operating power is not being supplied to the control mode detector 60 and the power controller 64, the monitor can only be operated after the user turns the power off, then on.

Thus, needless power consumption is prevented by controlling the supply of power to the computer's monitor and controlling its operation state during the time the computer system is not being used.

Figure 14:
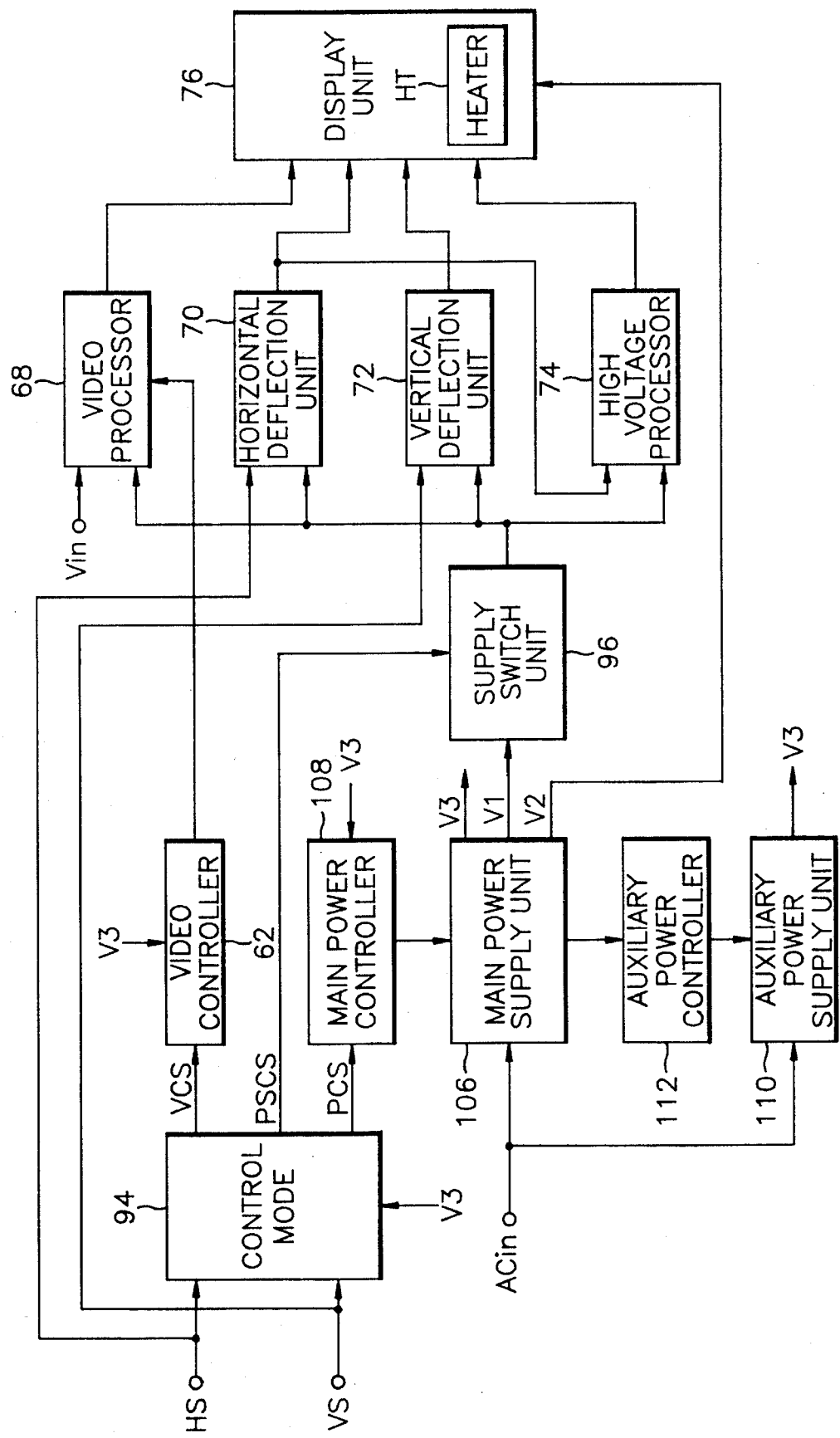
FIG. 14 is a block diagram showing still another embodiment of a power saving apparatus for use in a monitor constructed according to the principles of the present invention.

Meanwhile, the needless consumption of power can be prevented by stopping the supply of power in response to an OFF mode as described above, but after stopping the power, the user should switch input power source ACin off then on. To re-start the supply of power under the control of the computer 1, the apparatus shown in FIG. 14 is constructed by applying the power saving apparatus shown in FIG. 6 to the power saving apparatus for use in a monitor as shown in FIG. 11. In FIG. 14, a video controller 62, a video processor 68, a horizontal deflection unit 70, a vertical deflection unit 72, a high voltage processor 74, a display unit 76, a control mode detector 94 and a supply switch unit 96 have the same constitution and reference numeral as those shown in FIG. 11. Also, a main power supply unit 106, a main power controller 108, and auxiliary power supply unit 110, and an auxiliary power controller 112 are the same as the main power supply unit 40, the main power controller 46, the auxiliary power supply unit 48 and the auxiliary power controller 50 as shown in FIG. 6. Therefore, the operation of the present invention as shown in FIG. 14 can be easily understood with reference to the aforementioned description. Accordingly, a detailed description of the operation of the present invention as shown in FIG. 14 is omitted for the sake of brevity.

In summary, even if the supply of power to a computer's monitor is cut off by an activation of an OFF mode, normal operation can be resumed by activation of the ON mode, by continuously supplying operating power to the control mode detector 94 and the main power controller 108.

The preferred embodiment has been described in the aforementioned description of the present invention, but various modification can be done without deviating from the scope of the present invention. Specifically, it has been described that in response to an operation control signal, the supply power to a computer's peripheral equipment or monitor is controlled. However, note that the control can be set by attaching a motion sensor in front of the computer's monitor. A control mode can be activated based on the sensor's determination of how long a user has left his or her seat. Accordingly, the scope of present invention is to be determined by the claims and the equivalence of the claims, not only by the aforementioned embodiments. As described above, the present invention controls a supply of power of the operating state of a computer's peripheral equipment according to the computer's state of use, thereby greatly reducing the needless consumption of power.

What is claimed is:

1. A power saving apparatus for use in peripheral equipment comprising:

external control means for generating an operation control signal indicative of an OFF mode, said OFF mode indicating that said external control means has not received a data input from a user for a predetermined period of time;

power supply means for generating operating power and supplying the operating power to said peripheral equipment;

control input detection means for detecting a control mode indicated by said operation control signal, said control input detection means comprising:

frequency voltage converter means for receiving said operation control signal and generating a converted signal having a voltage magnitude corresponding to a frequency of said operation control signal; and comparator means for receiving said converted signal and providing a power control signal in dependence upon said converted signal; and power control means for receiving said power control signal and interrupting operating power supplied to the peripheral equipment from said power supply means when said control input detection means determines that said control mode indicates said OFF mode.

2. The power saving apparatus as claimed in claim 1, further comprised of said power control means comprising:

switching means connected between an alternating current power input and said power supply means; and driving means for switching said switching means to prevent said alternating current power input from delivering operating power to said power supply means when said control input detection means determines that said control mode indicates said OFF mode.

3. The power saving apparatus as claimed in claim 1, further comprised of said power supply means comprising:

an input rectifying circuit for receiving input power from a power input portion, said input rectifying circuit rectifying said input power and supplying rectified power to a transformer and to a voltage terminal of a pulse width modulation controller, said pulse width modulation controller generating a pulse width modulation signal;

switching means for switching a primary side of said transformer in response to said pulse width modulation signal, said switching operation inducing power in a secondary side of said transformer; and a plurality of output rectifying circuits for rectifying and smoothing the induced power and supplying operating power to a main circuit.

4. The power saving apparatus as claimed in claim 3, further comprised of said power supply means generating power at a plurality of voltage levels.

5. The power saving apparatus as claimed in claim 1, further comprised of said power control means comprising:

a first transistor having a principal electrical conduction path electrically connected to an output port of said control input detection means to receive said power control signal; and photo-coupling means electrically connected to said first transistor and cutting off the operating power supplied to said peripheral equipment from said power supply means in dependence upon a logic state of said power control signal.

6. The power saving apparatus as claimed in claim 5, further comprised of said power supply means comprising:

an input rectifying circuit for receiving input power from a power input portion, said input rectifying circuit rectifying said input power and supplying rectified power to a transformer and to a voltage terminal of a pulse width modulation controller, with said pulse width modulation controller generating a pulse width modulation signal;

switching means for switching a primary side of said transformer in response to said pulse width modulation signal, said switching .operation inducing power in a secondary side of said transformer; and plurality of output rectifying circuits for rectifying and smoothing the induced power and supplying operating power to a main circuit.

7. The power saving apparatus as claimed in claim 6, further comprised of said control input detection means detecting signals when said operation control signal has a predetermined frequency.

8. The power saving apparatus as claimed in claim 6, further comprised of said power supply means for generating power at a plurality of voltage levels.

9. A power saving apparatus for use in peripheral equipment comprising:
   computing means for generating a control signal indicative of an operational mode of said computing means;
   means for responding to said control signal by detecting an OFF mode indicating that said computing means has not received a data input for a predetermined period of time, said detecting means comprising:
      frequency voltage converter means for receiving said control signal and generating a converted signal having a voltage magnitude corresponding to a frequency of said control signal; and
      comparator means for receiving said convened signal and providing a power control signal in dependence upon said converted signal;
   means for generating operating power and supplying said operating power to the peripheral equipment; and
   power control means for receiving said power control signal and preventing delivery of the operating power to the peripheral equipment when said power control signal indicates that said OFF mode is detected.

10. A power saving apparatus for use in peripheral equipment comprising:
    external control means for generating an operation control signal indicative of a control mode, said control mode being one of an ON mode and an OFF mode and corresponding to a state of use of said external control means;
    control input detection means for detecting the control mode indicated by said operation control signal, said control input detection means comprising:
       frequency voltage converter means for receiving said operation control signal and generating a converted signal having a voltage magnitude corresponding to a frequency of said operation control signal; and
       comparator means for receiving said convened signal and providing a power control signal in dependence upon said converted signal;
    main power supply means for generating operating power and supplying said operating power to said peripheral equipment and to said control input detection means;
    main power control means for receiving said power control signal and interrupting operation of said main power supply means when the control mode detected by said control input detection means indicates said OFF mode, and for restarting operation of said main power supply means when the control mode detected by said control input detection means indicates said ON mode; and
    auxiliary power supply means for generating operating power for said control input detection means when the control mode detected by said control input detection means indicates said OFF mode.

11. The power saving apparatus as claimed in claim 10, further comprised of said main power supply means comprising:
    an input rectifying circuit for receiving input power from a power input portion, said input rectifying circuit rectifying said input power and supplying rectified power to a transformer and to a voltage terminal of a pulse width modulation controller, said pulse width modulation controller generating a pulse width modulation signal;
    switching means for switching a primary side of said transformer in response to said pulse width modulation signal, said switching operation inducing power in a secondary side of said transformer; and
    a plurality of output rectifying circuits for rectifying and smoothing the induced power and supplying operating power to a main circuit.

12. The power saving apparatus as claimed in claim 10, further comprised of said main power supply means generating power at a plurality of voltage levels.

13. The power saving apparatus as claimed in claim 10, further comprising auxiliary power control means for detecting an operational state of said main power supply means, said auxiliary power control means stopping operation of said auxiliary power supply means when said main power supply means is in an ON state supplying electrical power to said control input detection means, and restarting operation of said auxiliary power supply means when said main power supply means is in an OFF state interrupting said supplying of electrical power to said control input detection means.

14. A power saving apparatus for a monitor, comprising:
    external control means for generating first and second synchronizing signals indicative of a control mode, said control mode being one of a standby mode for interrupting video signals provided to said monitor, and an OFF mode for interrupting operating power provided to said monitor, said first and second synchronizing signals corresponding to a state of use of said external control means;
    control mode detection means for detecting the control mode indicated by said first and second synchronizing signals, said control mode detection means comprising first and second input detectors and mode decoding means for decoding outputs of said first and second input detectors, said first input detector comprising:
       first frequency voltage converter means for receiving said first synchronizing signal and generating a first converted signal having a voltage magnitude corresponding to a frequency of said first synchronizing signal; and
       first comparator means for receiving said first converted signal and providing a first control signal to a first input port of said mode decoding means; said second input detector comprising:
    second frequency voltage converter means for receiving said second synchronizing signal and generating a second converted signal having a voltage magnitude corresponding to a frequency of said second synchronizing signal; and
       second comparator means for receiving said second converted signal and providing a second control signal to a second input port of said mode decoding means;
    video control means for receiving a video control signal based on said first and second control signals from a first output port of said mode decoding means and muting a video signal to be processed by video processing means of said monitor when the control mode detected by said control mode detection means indicates said standby mode;
    power supply means for generating said operating power and supplying said operating power to said control mode detection means, to a video driving stage of said monitor and to a video display of said monitor; and
    power control means for receiving a power control signal based on said first and second control signals from a second output port of said mode decoding means and interrupting transmission of said operating power from said power supply means when the control mode detected by said control mode detection means indicates said OFF mode.

15. The power saving apparatus as claimed in claim 14, further comprised of said mode decoding means comprising:

first and second buffer means for receiving and buffering said first and second control signals, respectively;

an exclusive OR gate for logically combining a first output signal from said first buffer means with a second output signal from said second buffer means to generate said video control signal; and a NOR gate for logically combining said first output signal from said first buffer means with said second output signal from said second buffer means to generate said power control signal.

16. A power saving apparatus for use in a monitor comprising:

external control means for generating first and second synchronizing signals indicative of a control mode, said control mode being one of an ON mode for supplying operating power to said monitor, an OFF mode for interrupting operating power provided to said monitor, and a standby mode for interrupting video signals provided to said monitor, said first and second synchronizing signals corresponding to a state of use of said external control means;

control mode detection means for detecting the control mode indicated by said operation control signal, said control mode detection means comprising first and second input detectors and mode decoding means for decoding outputs of said first and second input detectors, said first input detector comprising:

first frequency voltage converter means for receiving said first synchronizing signal and providing a first converted signal having a voltage magnitude corresponding to a frequency of said first synchronizing signal; and first comparator means for receiving said first converted signal and providing a first control signal to a first input port of said mode decoding means; said second input detector comprising:

second frequency voltage converter means for receiving said second synchronizing signal and generating a second converted signal having a voltage magnitude corresponding to a frequency of said second synchronizing signal; and second comparator means for receiving said second convened signal and providing a second control signal to a second input port of said mode decoding means;

video control means for receiving a video control signal based on said first and second control signals from a first output port of said mode decoding means and muting a video signal to be processed by video processing means of said monitor when the control mode detected by said control mode detection means indicates said standby mode;

main power supply means for generating said operating power and supplying said operating power to said control mode detection means and to driving and display means of said monitor;

main power control means for receiving a power control signal based on said first and second control signals from a second output port of said mode decoding means and stopping operation of said main power supply means when the control mode detected by said control mode detection means indicates said OFF mode, and restarting operation of said main power supply means when the control mode detected by said control mode detection means indicates said ON mode; and auxiliary power supply means for generating operating power for said control mode detection means when the control mode detected by said control mode detection means indicates said OFF mode.

17. The power saving apparatus as claimed in claim 16, further comprising auxiliary power control means for detecting an operational state of said main power supply means, said auxiliary power control means stopping operation of said auxiliary power supply means when said main power supply means is in an ON state supplying electrical power to said control mode detection means, and restarting operation of said auxiliary power supply means when said main power supply means is in an OFF state interrupting said supplying of electrical power to said control mode detection means.

18. The power saving apparatus as claimed in claim 16, further comprised of said mode decoding means comprising:

first and second inverters for inverting said first and second control signals, respectively, to generate first and second inverted signals;

third and fourth inverters for inverting said first and second inverted signals, respectively, to generate third and fourth inverted signals;

a first AND gate for logically combining said first inverted signal with said fourth s inverted signal to generate said video control signal;

a second AND gate for logically combining said second inverted signal with said third inverted signal to generate a power switching control signal; and a third AND gate for logically combining said first inverted signal with said second inverted signal to generate said power control signal.

19. The power saving apparatus as claimed in claim 18, further comprising power supply switching means electrically connected between said main power supply means and said driving and display means of said monitor for selectively supplying operating power to said driving and display means in dependence upon said power switching control signal.

20. A power saving apparatus for use in a monitor, comprising:

external control means for generating first and second synchronizing signals indicative of a control mode, said control mode being one of an ON mode for supplying operating power to said monitor, an OFF mode for interrupting said operating power provided to said monitor, a suspensory mode for supplying said operating power to a heater of said monitor, and a standby mode for interrupting video signals provided to said monitor, said first and second synchronizing signals corresponding to a state of use of said external control means;

control mode detection means for detecting the control mode indicated by said operation control signal, said control mode detection means comprising first and second input detectors and mode decoding means for decoding outputs of said first and second input detectors, said first input detector comprising:

first frequency voltage converter means for receiving said first synchronizing signal and generating a first convened signal having a voltage magnitude corresponding to a frequency of said first synchronizing signal; and first comparator means for receiving said first converted signal and providing a first control signal to a first input port of said mode decoding means;

said second input detector comprising:

second frequency voltage converter means for receiving said second synchronizing signal and generating a second converted signal having a voltage magnitude corresponding to a frequency of said second synchronizing signal; and second comparator means for receiving said second converted signal and providing a second control signal to a second input port of said mode decoding means;

video control means for receiving a video control signal based on said first and second control signals from a first output port of said mode decoding means and muting a video signal to be processed by video processing means of said monitor when the control mode detected by said control mode detection means indicates said standby mode;

main power supply means for generating operating power and supplying said operating power to display driving means of said monitor and to said control mode detection means;

main power control means for receiving a power control signal based on said first and second control signals from a second output port of said mode decoding means and stopping operation of said main power supply means when the control mode detected by said control mode detection means indicates said OFF mode, and restarting operation of said main power supply means when the control mode detected by said control mode detection means indicates said ON mode;

auxiliary power supply means for generating said operating power for said control mode detection means when the control mode detected by said control mode detection means indicates said OFF mode; and power supply switching means connected between said main power supply means and said display driving means for interrupting operating power to said display driving means when the control mode detected by said control mode detection means indicates said suspensory mode.

21. The power saving apparatus as claimed in claim 20, further comprising auxiliary power control means for detecting an operational state of said main power supply means, said auxiliary power control means stopping operation of said auxiliary power supply means when said main power supply means is in an ON state supplying electrical power to said control mode detection means, and restarting operation of said auxiliary power supply means when said main power supply means is in an OFF state interrupting said supplying of electrical power to said control mode detection means.

22. The power saving apparatus as claimed in claim 20, further comprised of said mode decoding means comprising:

first and second inverters for inverting said first and second control signals, respectively, to generate first and second inverted signals;

third and fourth inverters for inverting said first and second inverted signals, respectively, to generate third and fourth inverted signals;

a first AND gate for logically combining said first inverted signal with said fourth inverted signal to generate said video control signal;

a second AND gate for logically combining said second inverted signal with said third inverted signal to generate a power switching control signal to control operation of said power supply switching means; and a third AND gate for logically combining said first inverted signal with said second inverted signal to generate said power control signal.

23. A power saving apparatus for use in a monitor of a computer comprising:

control mode detection means for detecting a control mode corresponding to a presence or absence of a horizontal synchronizing signal and a vertical synchronizing signal, said control mode being one of an ON mode for supplying operating power to said monitor, an OFF mode for interrupting said operating power provided to said monitor, a suspensory mode for supplying said operating power to a heater of said monitor, and a standby mode for interrupting video signals provided to said monitor, said horizontal and vertical synchronizing signals corresponding to the computer's state of use, said control mode detection means comprising first and second input detectors for respectively processing said horizontal synchronizing signal and said vertical synchronizing signal and a mode decoding means for decoding outputs of said first and second input detectors, said first input detector comprising:

first frequency voltage converter means for receiving said horizontal synchronizing signal and generating a first converted signal having a voltage magnitude corresponding to a frequency of said horizontal synchronizing signal; and first comparator means for receiving said first convened signal and providing a first control signal to a first input port of said mode decoding means;

said second input detector comprising:

second frequency voltage converter means for receiving said vertical synchronizing signal and generating a second converted signal having a voltage magnitude corresponding to a frequency of said vertical synchronizing signal; and second comparator means for receiving said second converted signal and providing a second control signal to a second input port of said mode decoding means;

video control means for receiving a video control signal based on said first and second control signals from a first output port of said mode decoding means and muting a video signal to be processed by video processing means of said monitor when the control mode detected by said control mode detection means indicates said standby mode;

main power supply means for generating operating power and supplying said operating power to display driving means of said monitor and to said control mode detection means;

main power control means for receiving a power control signal based on said first and second control signals from a second output port of said mode decoding means and stopping operation of said main power supply means when the control mode detected by said control mode detection means indicates said OFF mode, and restarting operation of said main power supply means when the control mode detected by said control mode detection means indicates said ON mode;

auxiliary power supply means for generating said operating power for said control mode detection means and said main power control means when the control mode detected by said control mode detection means indicates said OFF mode; and power supply switching means connected between said main power supply means and said display driving means for cutting off operating power to said display driving means when the control mode detected by said control mode detection means indicates said suspensory mode.

24. The power saving apparatus as claimed in claim 23, further comprising auxiliary power control means for detecting an operational state of said main power supply means, said auxiliary power control means stopping operation of said auxiliary power supply means when said main power supply means is in an ON state supplying electrical power to said control mode detection means and said main power control means, and restarting operation of said auxiliary power supply means when said main power supply means is in an OFF state interrupting said supplying of electrical power to said control mode detection means and said main power control means.

25. The power saving apparatus as claimed in claim 23, further comprised of said control mode detection means comprising:

said mode decoding means for decoding said first and second control signals of said first and second input detection means, respectively, to detect said control mode.

26. The power saving apparatus as claimed in claim 25, further comprised of said mode decoding means comprising:

first and second inverters for inverting said first and second control signals, respectively, to generate first and second inverted signals;

third and fourth inverters for inverting said first and second inverted signals, respectively, to generate third and fourth inverted signals;

a first AND gate for logically combining said first inverted signal with said fourth inverted signal to generate said video control signal;

a second AND gate for logically combining said second inverted signal with said third inverted signal to generate a power switching control signal to control operation of said power supply switching means; and a third AND gate for logically combining said first inverted signal with said second inverted signal to generate said power control signal.

27. A power saving apparatus for use in a monitor of a computer comprising:

control mode detection means for detecting a control mode corresponding to presence or absence of a horizontal synchronizing signal and a vertical synchronizing signal, said control mode being one of an ON mode, an OFF mode, a suspensory mode, and a standby mode and corresponding to the computer's state of use, said control mode detection means comprising:

first control input detection means for detecting presence or absence of said horizontal synchronizing signal by converting said horizontal synchronizing signal into a first signal having a voltage level corresponding to a frequency of said horizontal synchronizing signal;

second control input detection means for detecting presence or absence of said vertical synchronizing signal by converting said vertical synchronizing signal into a second signal having a voltage level corresponding to a frequency of said vertical synchronizing signal; and mode decoding means for decoding said first and second signals of said first and second input detection means to detect said control mode.;

video control means for muting a video signal processed by video processing means of said monitor when the control mode detected by said control mode detection means indicates said standby mode;

main power supply means for generating operating power and supplying said operating power to display driving means, to display means, and to said control detection means;

main power control means for stopping operation of said main power supply means when the control mode detected by said control mode detection means indicates said OFF mode, and restarting operation of said main power supply means when the control mode detected by said control mode detection means indicates said ON mode;

auxiliary power supply means for generating operating power for said control mode detection means and said main power control means;

auxiliary power control means for detecting an operational state of said main power supply means, said auxiliary power control means stopping operation of said auxiliary power supply means when said main power supply means is in an ON state, and restarting operation of said auxiliary power supply means when said power supply means is in an OFF state; and power supply switching means connected between said main power supply means and said display driving means for cutting off operating power to said display driving means when the control mode detected by said control mode detection means indicates said suspensory mode.

* * * * *